(12) United States Patent
Stewart

(10) Patent No.: US 7,760,778 B2
(45) Date of Patent: Jul. 20, 2010

(54) THIN-FILM EVAPORATIVE COOLING FOR SIDE-PUMPED LASER

(75) Inventor: Brian K. Stewart, Hayes, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/670,044

(22) Filed: Feb. 1, 2007

(65) Prior Publication Data

US 2007/0206648 A1 Sep. 6, 2007

Related U.S. Application Data

(60) Provisional application No. 60/780,172, filed on Mar. 6, 2006.

(51) Int. Cl.
*H01S 3/04* (2006.01)
(52) U.S. Cl. .............................. 372/35; 372/34; 372/70; 372/75
(58) Field of Classification Search .................... 372/34, 372/35, 70, 75
See application file for complete search history.

(56) References Cited

U.S. PATENT DOCUMENTS

| | | | |
|---|---|---|---|
| 4,306,278 A | 12/1981 | Fulton et al. | |
| 4,757,370 A | 7/1988 | Agonafer et al. | |
| 5,520,244 A | 5/1996 | Mundinger et al. | |
| 5,561,987 A * | 10/1996 | Hartfield et al. | ............... 62/471 |
| 5,719,444 A | 2/1998 | Tilton et al. | |
| 5,777,384 A | 7/1998 | Root et al. | |
| 6,354,370 B1 | 3/2002 | Miller et al. | |
| 6,552,901 B2 | 4/2003 | Hildebrandt | |
| 6,571,569 B1 | 6/2003 | Rini et al. | |
| 6,768,751 B2 | 7/2004 | Hoar | |
| 2004/0247003 A1* | 12/2004 | Mercer | ......................... 372/35 |
| 2005/0183844 A1 | 8/2005 | Tilton et al. | |

OTHER PUBLICATIONS

John G. Collier, et al. "Convective Boiling and Condensation," Oxford University Press, 3rd ed., 1996, pp. 138-139.

* cited by examiner

*Primary Examiner*—Minsun Harvey
*Assistant Examiner*—Kinam Park
(74) *Attorney, Agent, or Firm*—Robin W. Edwards

(57) ABSTRACT

A system and method are provided for cooling a crystal rod of a side-pumped laser. A transparent housing receives the crystal rod therethrough so that an annular gap is defined between the housing and the radial surface of the crystal rod. A fluid coolant is injected into the annular gap such the annular gap is partially filled with the fluid coolant while the radial surface of the crystal rod is wetted as a thin film all along the axial length thereof.

17 Claims, 6 Drawing Sheets

THIN-FILM EVAPORATIVE COOLING FOR SIDE-PUMPED LASER

Pursuant to 35 U.S.C. §119, the benefit of priority from provisional application 60/780,172, with a filing date of Feb. 6, 2006, is claimed for this non-provisional application.

ORIGIN OF THE INVENTION

This invention was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates to cooling systems and methods for lasers. More specifically, the invention is a thin-film evaporative cooling system and method for use with side-pumped lasers.

2. Description of the Related Art

The essential elements of a side-pumped laser are the laser's crystal rod and one or more laser diodes that are spaced apart from the radial surface of the crystal rod. The laser diode(s) "pump" light energy radially into the crystal rod. Due to the low optical efficiencies of luminescent crystals, most of the incident energy is converted into heat. The quality of the luminescent crystal output is typically characterized by the pulse energy, and the central tendency around a single output wavelength. The pulse energy is increased with lower average crystal temperatures while the output wavelength is affected by temperature as well. Consequently, large temperature gradients across the crystal (i.e., normal to the rod's cross-section) produce a wide variance in the output wavelength. Consequently, a side-pumped laser crystal thermal management system has three goals:

1. Prevent thermally-induced damage due to thermally-induced stresses.
2. Maintain the crystal rod at as low a temperature as possible.
3. Minimize temperature variation across the crystal rod.

Currently, conductive cooling is used for thermal management in many side-pumped lasers. Typically, a thermally-conductive support structure is coupled to the crystal rod. While totally passive, conductively-cooled configurations generate insufficient cooling, produce non-uniform temperature distributions across the crystal rod's cross-section, and are sensitive to minor variations in contact pressure at the conductive interface.

SUMMARY OF THE INVENTION

Accordingly, it is an object of the present invention to provide a thermal management method and system for a side-pumped laser.

Another object of the present invention is to provide a method and system that uniformly cools the crystal rod of a side-pumped laser.

Other objects and advantages of the present invention will become more obvious hereinafter in the specification and drawings.

In accordance with the present invention, a system and method are provided for cooling a crystal rod of a side-pumped laser. A transparent housing receives the crystal rod therethrough. An annular gap is defined between the housing and the radial surface of the crystal rod all along the axial length of the crystal rod. A fluid coolant is injected into the annular gap such that the annular gap is partially filled with the fluid coolant while the radial surface of the crystal rod is wetted as a thin film all along the axial length thereof. The partial filling of the annular gap ensures an evaporative region will be formed over the wetted surface of the crystal rod.

DETAILED DESCRIPTION OF THE INVENTION

Figure 1:
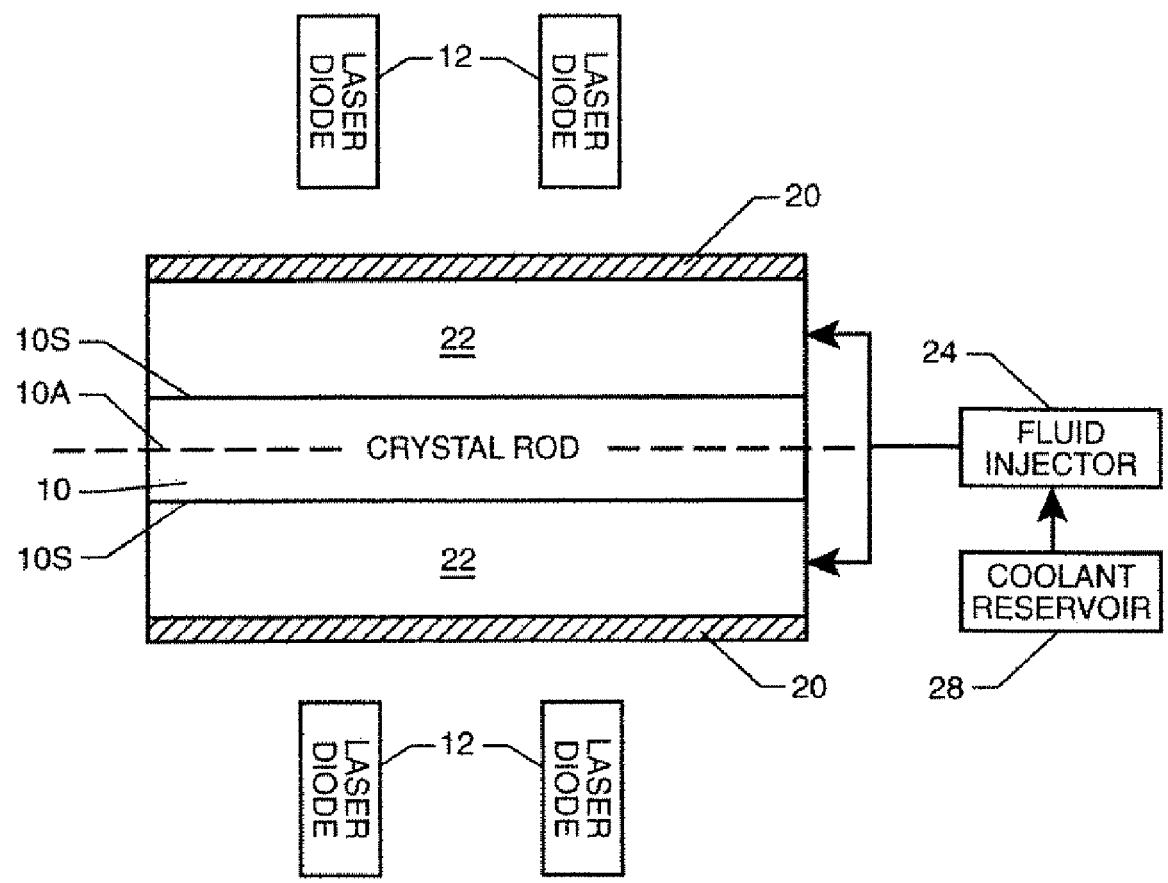
FIG. 1 is a part schematic, part cross-sectional view of a side-pumped laser equipped with a thin-film evaporative cooling system in accordance with an embodiment of the present invention.

Referring now to the drawings and more particularly to FIG. 1, a conventional side-pumped laser is equipped with a thermal management system in accordance with an embodiment of the present invention. As is well-known in the art, the essential elements of a side-pumped laser are a crystal rod 10 and one or more laser diodes 12. Crystal rod 10 extends axially along the longitudinal axis 10A thereof. Laser diodes 12 are positioned adjacent to crystal rod 10 such that light energy pumped from laser diodes 12 impinges on a radial surface 10S of crystal rod 10. Typically, a number of laser diodes 12 are distributed radially about crystal rod 10 at different positions along the axial length of crystal rod 10. However, it is to be understood that the illustrated version is merely an example and that the particular type/shape/length of crystal rod 10 as well as the particular number/position of laser diodes 12 are not limitations of the present invention.

In accordance with the present invention, an optically transparent housing 20 (e.g. a glass housing) encases crystal rod 10 all along the axial length thereof. The transparency of housing 20 allows the light energy emanating from laser diodes 12 to pass into crystal rod 10. The internal surface of housing 20 is spaced apart from crystal rod 10 such that an annular region 22 is formed therebetween. Typically, crystal rod 10 and housing 20 are cylindrical in geometry with annular region 22 being of constant thickness along the length of crystal rod 10. A fluid injector 24 injects a coolant 26 in fluid form from a reservoir 28 into annular region 22 at one axial end 10E of crystal rod 10 as illustrated.

The operation of this embodiment will be explained now with reference to FIG. 2. In general, fluid injector 24 injects an amount of coolant 26 into annular region 22 under pressure such that the entire radial surface 10S of crystal rod 10 is wetted with coolant 26 while permitting an ullage or evaporative region 30 to be formed in annular region 22 between coolant 26 and housing 20. In other words, coolant 26 only partially fills annular region 22. Such partial filling of annular region 22 allows coolant 26 to evaporate into evaporative region 30 as coolant 26 heats up. The evaporated coolant in region 30 will flow in region 30 along with coolant 26 as indicated by directional arrow 32. The flowing coolant 26 and the evaporated form thereof in evaporative region 30 exit annular region 22 at axial end 10EE of crystal rod 10. If desired, the exiting coolant 26 and the evaporated form thereof can be returned to reservoir 28 as indicated by the return line referenced by numeral 40.

In order to provide for the total wetting of radial surface 10S, factors such as the length/diameter of crystal rod 10, the coolant injection pressure/velocity, and the adhesion between coolant 26 and radial surface 10S need to be considered. Furthermore, the cooling effect provided by coolant 26 must be considered. That is, effective cooling of the crystal rod is achieved with a coolant that can exhibit cooling properties when only "wetting" radial surface 10S with a thin-film thereof to prevent formation of bubbles by nucleate boiling. One of the requirements for fluid cooling of side-pumped lasers is that the incident diode pump radiation must be transmitted through the cooling medium without measurable attenuation. The formation of bubbles in the film would scatter the incident beam significantly, and is considered a failure mode for the thin-film system. As is known in the art, nucleated bubbles in a thin-film can only grow if the wall superheat is greater than the critical value for a given bubble radius. In other words, as the fluid film thins, the wall superheat required for bubble formation and growth increases well above the liquid's saturation temperature. See John G. Collier et al., "Convective Boiling and Condensation," $3^{rd}$ edition, Oxford University Press, Oxford, 1996. Taking all of these factors into consideration, suitable coolants include any of a variety of refrigerants having low saturation temperatures. A suitable class of refrigerants is azeotropic refrigerants, some of which can have saturation temperatures on the order of −50° C. or less. Refrigerants of this type would have to "wet" radial surface 10S at a thickness of approximately 10 microns or less to prevent nucleate-boiling bubble formation.

Figure 2:
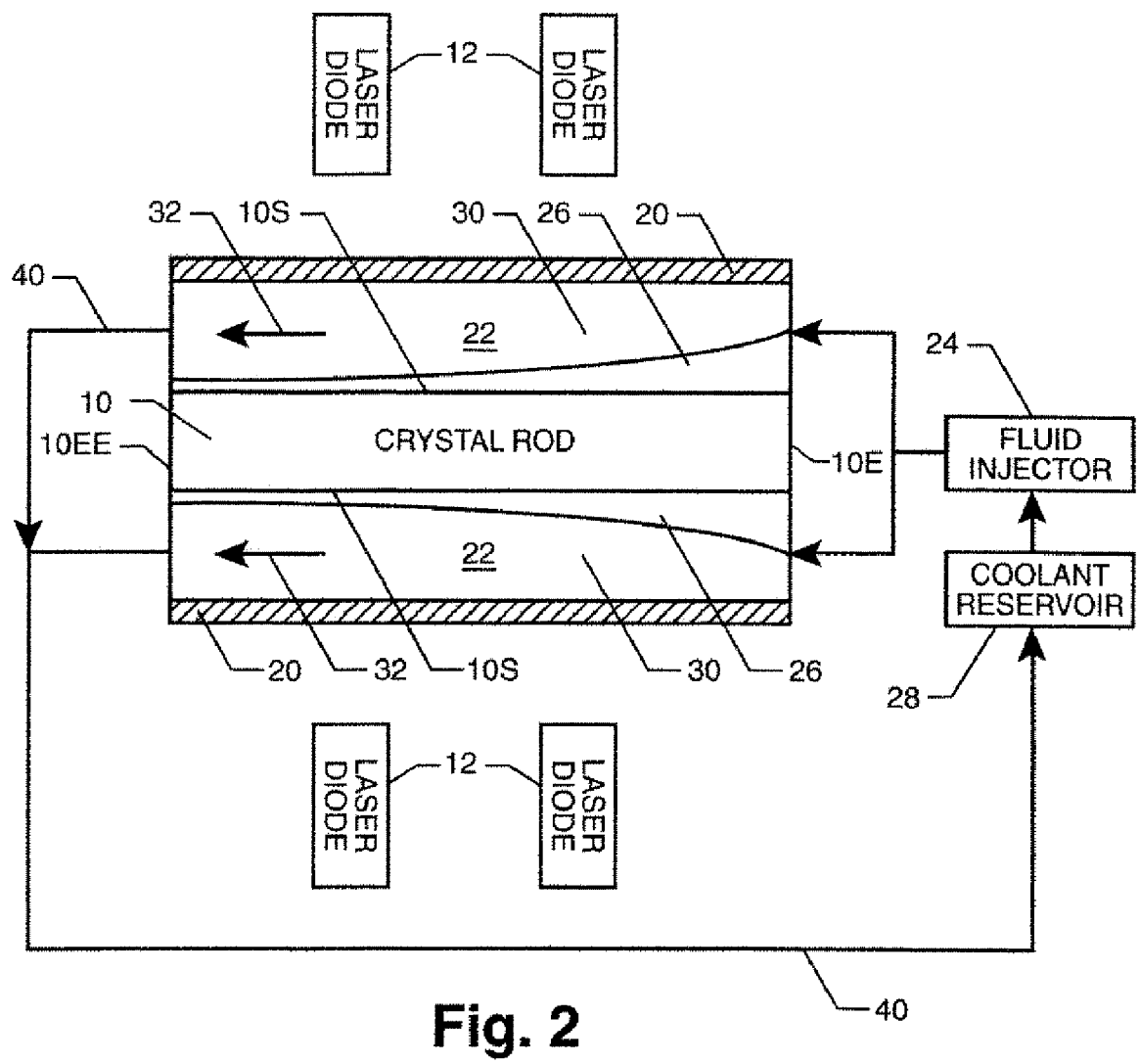
FIG. 2 is an operational view of the FIG. 1 embodiment.
Figure 3:
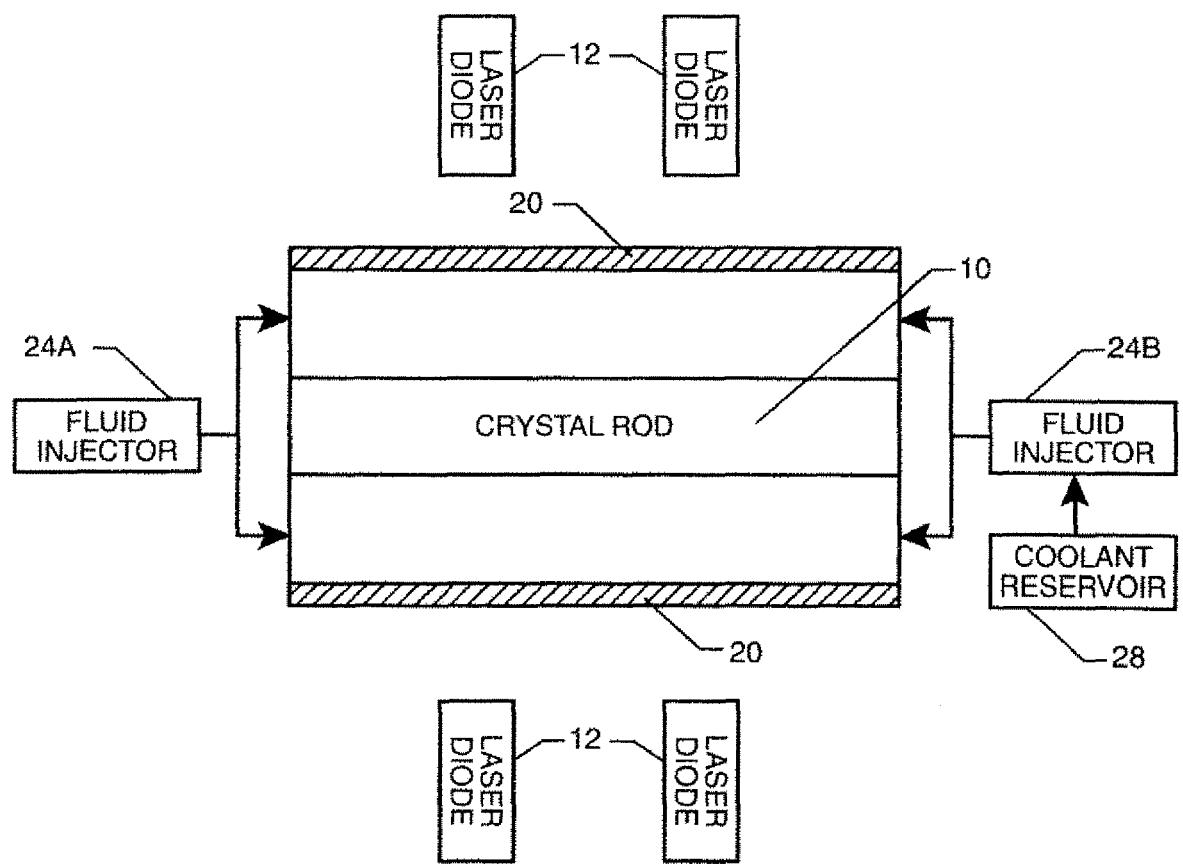
FIG. 3 is a part schematic, part cross-sectional side view of a side-pumped laser equipped with thin-film evaporative cooling system in accordance with another embodiment of the present invention.
Figure 4:
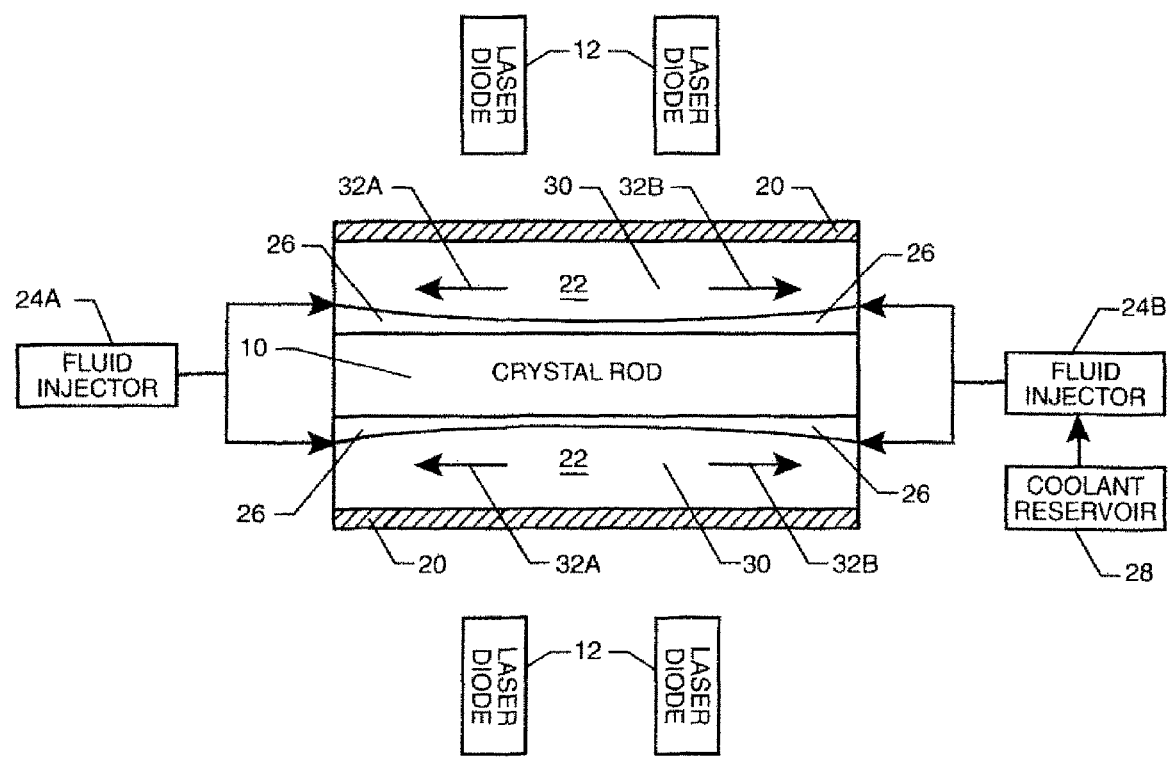
FIG. 4 is an operational view of the FIG. 3 embodiment.

The embodiment illustrated in FIGS. 1 and 2 minimizes shear forces at the liquid-vapor boundary (i.e., the boundary between coolant 26 and evaporative region 30). However, since the entire liquid mass of coolant 26 is injected at one axial end of crystal rod 10, the thickness of coolant 26 at its point of injection could exceed the "bubble formation" thickness. Accordingly, it may be desirable to inject coolant 26 into annular region 22 from opposing axial ends thereof as illustrated in FIGS. 3 and 4. More specifically, fluid injectors 24A and 24B inject coolant 26 all around crystal rod 10 from either end thereof. Evaporative region 30 will still be formed between coolant 26 and housing 20 with the evaporated coolant in region 30 flowing in opposite directions as indicated by directional arrows 32A and 32B. Advantages of this embodiment are the reduction in coolant injection velocity and vapor exit velocity as compared to the embodiment shown in FIGS. 1 and 2. However, coolant flow into annular region 22 must be balanced with the evaporation rate in order to prevent the accumulation of excess coolant 26 on crystal rod 10.

Figure 5:
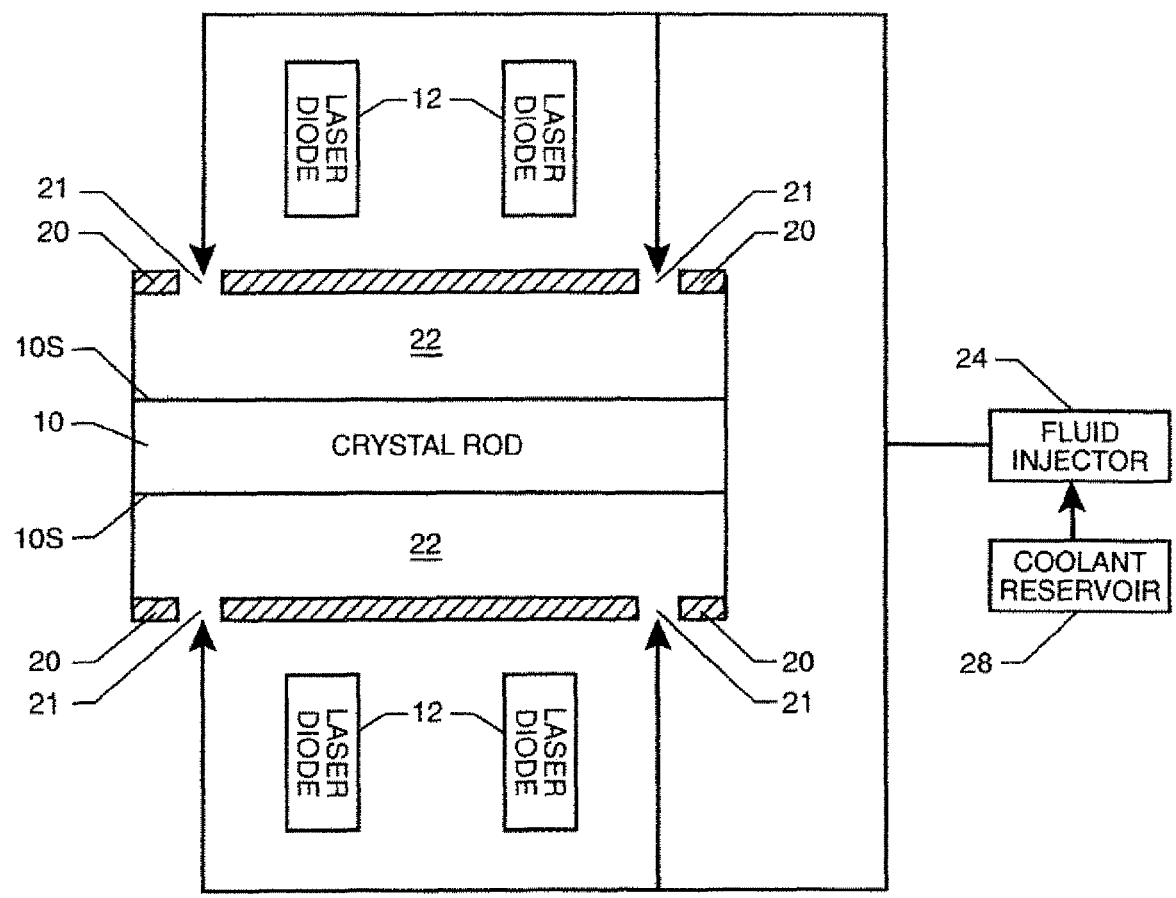
FIG. 5 is a schematic, part cross-sectional end view of a side-pumped laser equipped with a thin-film evaporative cooling system in accordance with yet another embodiment of the present invention.
Figure 6:
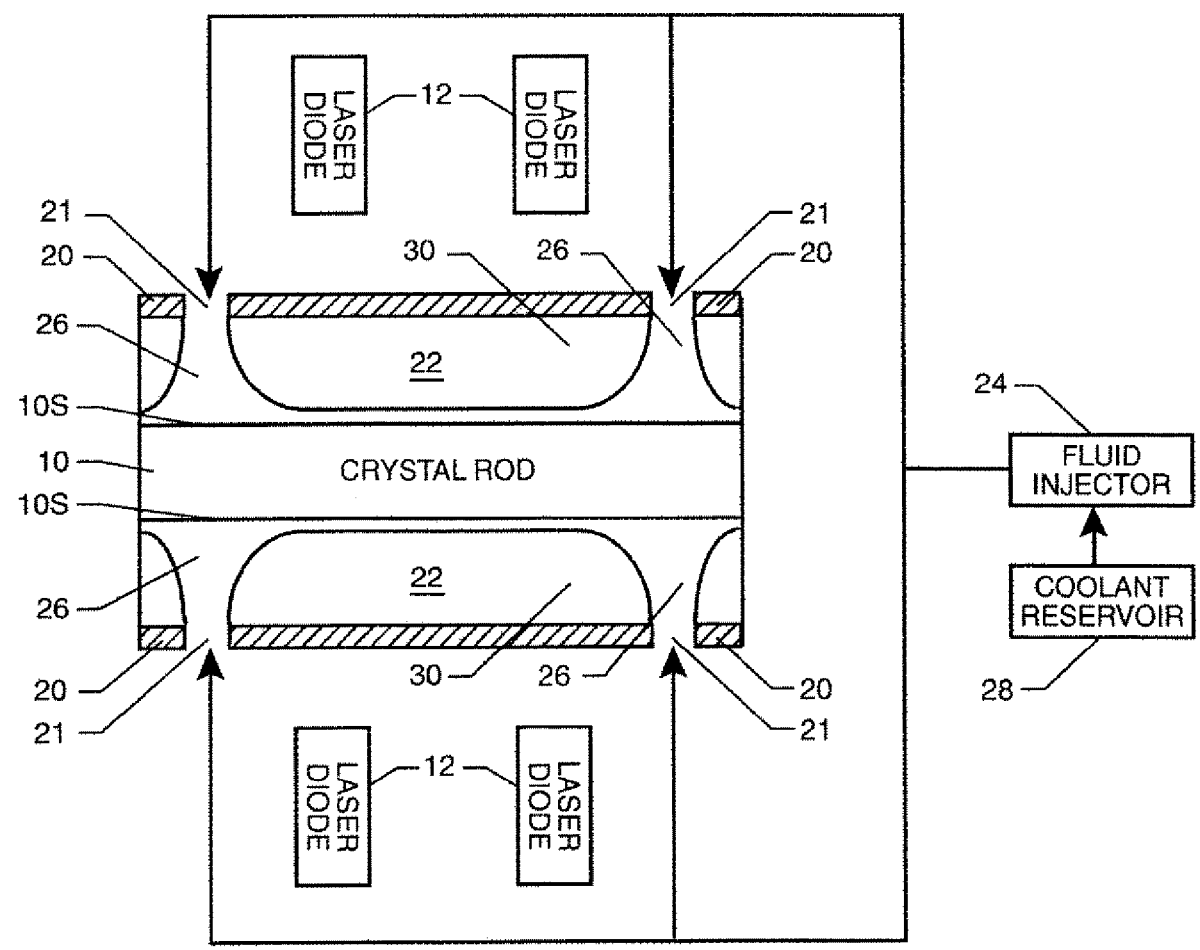
FIG. 6 is an operational view of the FIG. 5 embodiment.

Still another embodiment of the present invention is illustrated in FIGS. 5 and 6 where coolant 26 is introduced/injected through one or more ports 21 formed in the radial wall of housing 20. A number of discrete sorts 21 could be formed in housing 20 at positions distributed about radial surface 10S of crystal rod 10. The number and positioning of such ports are not limitations of the present invention. By increasing the number of coolant injection locations, this embodiment may decrease the coolant injection pressure/velocity requirements.

The advantages of the present invention are numerous. By generating a thin-film, bubble-free layer of liquid coolant along the radial surface of a laser's crystal rod and an evaporative region above the thin-film, the present invention provides a novel approach to cooling side-pumped lasers without affecting laser performance.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for cooling a crystal rod of a side-pumped laser, comprising:
    a transparent housing adapted to receive the crystal rod therethrough wherein an annular gap is defined between said housing and the radial surface of the crystal rod all along the axial length of the crystal rod;
    a fluid coolant; and
    means for injecting said fluid coolant into said annular gap such that said annular gap is partially filled with said fluid coolant and the radial surface of the crystal rod is wetted all along the axial length thereof.

2. A system as in claim 1 wherein said means injects said fluid coolant into said annular gap at one axial end thereof.

3. A system as in claim 1 wherein said means injects said fluid coolant into said annular gap at opposing axial ends thereof.

4. A system as in claim 1 wherein said means injects said fluid coolant into said annular gap through at least one port formed in a radial wall of said housing.

5. A system as in claim 1 wherein said housing comprises a glass housing.

6. A system as in claim 1 wherein said housing is cylindrical.

7. A system as in claim 1 wherein said fluid coolant comprises an azeotropic refrigerant having a saturation temperature not to exceed approximately −50° C.

8. A system for cooling a crystal rod of a side-pumped laser, comprising:
    a glass housing adapted to receive the crystal rod therethrough wherein an annular gap is defined between said housing and the radial surface of the crystal rod all along the axial length of the crystal rod;
    an azeotropic refrigerant fluid having a saturation temperature not to exceed approximately −50° C.; and
    means for injecting said fluid into said annular gap such that said annular gap is partially filled with said fluid and the radial surface of the crystal rod is wetted with said fluid all along the axial length thereof to a thickness not to exceed approximately 10 microns.

9. A system as in claim 8 wherein said means injects said fluid into said annular gap at one axial end thereof.

10. A system as in claim 8 wherein said means injects said fluid into said annular gap at opposing axial ends thereof.

11. A system as in claim 8 wherein said means injects said fluid into said annular gap through at least one port formed in a radial wall of said housing.

12. A system as in claim 8 wherein said housing is cylindrical.

13. A method of cooling a crystal rod of a side-pumped laser, comprising the steps of:
    providing a transparent housing adapted to receive the crystal rod therethrough wherein an annular gap is defined between said housing and the radial surface of the crystal rod all along the axial length of the crystal rod; and injecting a fluid coolant into said annular gap such that said annular gap is partially filled with said fluid coolant and the radial surface of the crystal rod is wetted all along the axial length thereof.

14. A method according to claim 13 wherein said step of injecting includes the step of introducing said fluid coolant into said annular gap at one axial end thereof.

15. A method according to claim 13 wherein said step of injecting includes the step of introducing said fluid coolant into said annular gap at opposing axial ends thereof.

16. A method according to claim 13 wherein said step of injecting includes the step of introducing said fluid coolant into said annular gap through at least one port formed in a radial wall of said housing.

17. A method according to claim 13 wherein said fluid coolant comprises an azeotropic refrigerant having a saturation temperature not to exceed approximately −50° C.

* * * * *